US009954646B1

(12) United States Patent
Marcin et al.

(10) Patent No.: US 9,954,646 B1
(45) Date of Patent: Apr. 24, 2018

(54) OUTPUT FRAME CORRECTION FOR UNSTABLE VIDEO STREAMS

(71) Applicant: Twitch Interactive, Inc., San Francisco, CA (US)

(72) Inventors: Ivan Marcin, Palo Alto, CA (US); Yueshi Shen, Cupertino, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 107 days.

(21) Appl. No.: 15/197,493

(22) Filed: Jun. 29, 2016

(51) Int. Cl.

| | |
|---|---|
| ***H04L 1/00*** | (2006.01) |
| ***H04L 29/06*** | (2006.01) |
| ***H04L 29/08*** | (2006.01) |
| ***H04L 12/26*** | (2006.01) |
| ***H04L 12/823*** | (2013.01) |
| ***H04N 21/235*** | (2011.01) |

(52) U.S. Cl.
CPC ........ *H04L 1/0041* (2013.01); *H04L 43/0823* (2013.01); *H04L 47/32* (2013.01); *H04L 65/604* (2013.01); *H04L 67/10* (2013.01); *H04N 21/235* (2013.01)

(58) Field of Classification Search
CPC ... H04L 1/0041; H04L 43/0823; H04L 47/32; H04L 65/604; H04L 67/10; H04L 1/00; H04L 1/0078; H04L 43/0829; H04L 43/0847; H04L 43/0852; H04N 21/235
See application file for complete search history.

(56) References Cited

U.S. PATENT DOCUMENTS

2013/0227158 A1* 8/2013 Miller .................... H04L 65/60 709/231
2014/0368734 A1* 12/2014 Hoffert ............. H04N 5/44591 348/564
2015/0215359 A1* 7/2015 Bao ...................... H04L 65/605 709/219

* cited by examiner

*Primary Examiner* — Christine T. Tu
(74) *Attorney, Agent, or Firm* — Baker & Hostetler LLP

(57) ABSTRACT

Techniques for output frame correction for unstable video streams are described herein. A video item may be transmitted via an input video stream from a first entity to a second entity over one or more electronic communications networks. The incoming frames from the input video stream may then be used, by the second entity, to generate an output video stream for presentation to one or more viewers. The transmission of the input video stream may temporarily become unstable and may be interrupted such that one or more frames of the input video stream are delayed and/or lost. When a transmission interruption is detected, the output video stream may be adjusted by inserting one or more correction frames into the output video stream. The inserted correction frames may include one or more repetitions of one or more prior frames in the output video stream and/or one or more interpolated frames.

20 Claims, 9 Drawing Sheets

OUTPUT FRAME CORRECTION FOR UNSTABLE VIDEO STREAMS

BACKGROUND

The use of electronic communications networks for transmission of video content has increased rapidly in recent years. In many examples, video content may be transmitted using streaming technology, which may allow portions of a video content item to be presented to a viewer at the same time that subsequent portions of the video content are being transmitted. In order to maintain a sufficient transmission speed and/or quality, streaming video transmissions may generally require a generally stable network connection between senders and receivers. However, conditions such as network congestion and saturation, encoding errors, Internet Service Provider (ISP) errors, and others may cause temporary unstable conditions at some points during the course of a streaming transmission. These unstable conditions may result in one or more frames within a transmission being lost or delayed. Some conventional video streaming systems may attempt to handle such problems using various approaches, such as temporarily freezing presentation of the output video stream on a particular frame, showing an icon (e.g., spinning circle) indicating that the transmission is interrupted, or inserting placeholder images or videos (e.g., advertisements, indications of technical difficulty, etc.). These conventional approaches may, however, be disturbing to users, for example because they may freeze and/or interrupt the presentation of the video content. When the frozen and/or interrupted video content resumes, there may be noticeable changes in positions and features of displayed objects, potentially resulting in a jumpy, inconsistent, and unnatural viewing experience.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
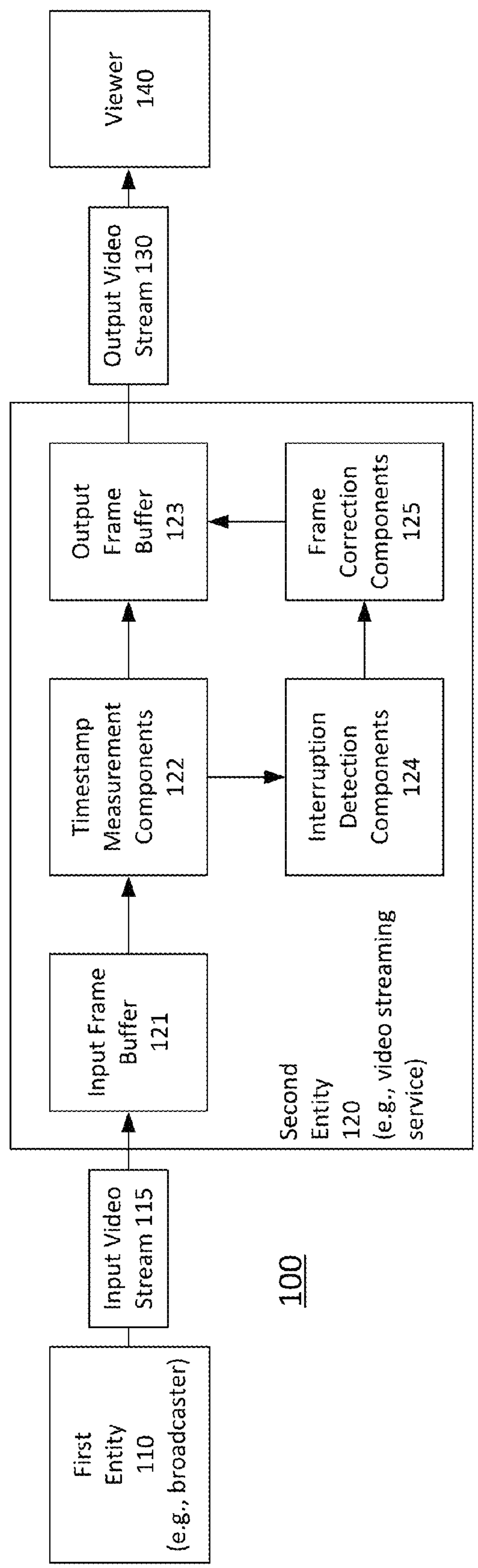
FIG. 1 is a diagram illustrating an example system for output frame correction that may be used in accordance with the present disclosure.

Techniques for output frame correction for unstable video streams are described herein. In some examples, a video item, such as a video game, movie, news or sports broadcast, may be transmitted via an input video stream from a first entity to a second entity over one or more electronic communications networks. Upon receiving incoming image frames from the input video stream, they may be temporarily stored, by the second entity, in an input frame buffer. The incoming frames from the input video stream may then be used, by the second entity, to generate an output video stream for presentation to one or more viewers. The incoming frames may include timestamps that indicate an ordering of the frames. In some examples, under stable (e.g., non-interrupted) operating conditions, the output video stream may include transmitted image frames in the same order that they are transmitted by the first entity. In some cases, however, the transmission of the input video stream may become unstable and may be interrupted such that one or more frames of the input video stream are delayed and/or lost (i.e., not received by the second entity). In some examples, the second entity may examine the timestamps of the incoming frames in order to determine that such a transmission interruption has occurred. For example, a transmission interruption may be detected when there are gaps in the sequence of the incoming frames, when incoming frames are received out of sequence with respect to one another, and/or when no incoming frames are received within a particular time interval.

In some examples, when a transmission interruption is detected, the output video stream may be adjusted by inserting one or more correction frames into the output video stream. The inserted correction frames may include one or more repetitions of one or more prior frames in the output video stream and/or one or more interpolated frames. In particular, in some examples, one or more interpolated frames may be inserted between two original frames that are received from the first entity. An interpolated frame is a frame that is not included in the input video stream and that is inserted in the output video stream between two frames that are included in the input video stream (referred to hereinafter as original frames) based, at least in part, on interpolation of states of the original frames. An interpolated frame may be generated, for example, by identifying a state (e.g., location, rotation, orientation, size, color, etc.) of a particular object in each of the original frames between which the interpolated frame is inserted. The states of the object in the original frames may then be used to determine an interpolated (e.g., intermediate) state with which to depict the object in the interpolated frame. In some examples, in addition to the two original frames between which the interpolated frame is inserted, other frames may also be used to determine the interpolated state, such as by calculating an estimated rate of change of the state of an object.

When a transmission interruption is detected, a quantity of frames associated with the transmission interruption (e.g., a quantity of lost and/or delayed frames) may be determined. The quantity of correction frames that are inserted into the output stream may then be determined based, at least in part, on the quantity frames associated with the transmission interruption. For example, in some cases, the quantity of inserted correction frames may be equivalent to the quantity of frames associated with the transmission interruption. In some examples, the input buffer may be assigned to hold a designated quantity of incoming frames and may become temporarily depleted (e.g., may hold less than the designated quantity) after a transmission interruption has occurred. In some cases, equating the quantity of inserted correction frames to the quantity of frames associated with the transmission interruption may, upon completion of the insertion of the correction frames, allow the input frame buffer to re-filled to its designated quantity of input frames.

In some examples, insertion of the correction frames into the output stream in response to a detected transmission interruption may provide a number of advantages. For example, in some cases, insertion of the correction frames may allow a transmission interruption to be corrected without freezing or interrupting the output video stream. In particular, when an output stream is frozen or interrupted, viewers may be able to easily detect that a transmission interruption has occurred. By contrast, in some examples, the insertion of correction frames may cause viewers to be unable or hardly able to detect an occurrence of a transmission interruption. Additionally, freezing or interrupting of an output video stream may result in a jumpy and inconsistent appearance of the output video. By contrast, in some examples, insertion of correction frames may reduce these negative effects, allowing movements to appear less jarring and more natural.

FIG. 1 is a diagram illustrating an example system 100 for output frame correction that may be used in accordance with the present disclosure. In the example of FIG. 1, a second entity 120 receives an input video stream 115 from a first entity 110. Second entity 120 may then, in turn, transmit an output video stream 130 to viewer 140. The input video stream 115 and the output video stream 130 may be transmitted using one or more electronic communications networks, for example one or more local area networks (LANs) and/or one or more wide area networks (WANs), such as the Internet. The input video stream 115 and output video stream 130 may be transmitted using streaming video transmission techniques that allow portions of a video item to be viewed by viewer 140 while subsequent portions of the video item are being transmitted in input video stream 115 and/or output video stream 130. For example, in some cases, input video stream 115 and output video stream 130 may be transmitted using real-time messaging protocol (RTMP) or another streaming video transmission protocol. As should be appreciated, in some examples, input and output video streams 115 and 130 may be encoded for transmission and decoded upon reception, for example by various encoding and decoding components (not shown in FIG. 1).

Input video stream 115 and output video stream 130 may be used for transmission of a video item, such as a video game, movie, news, sports, or other video media item. In some examples, the transmitted video item may be a live streaming video item that is captured, for example using a video camera, screen capture software, or another capture component, and then transmitted and viewed immediately or nearly immediately after being captured. Additionally, in some examples, first entity 110 may be a video game broadcaster and second entity 120 may be a video game streaming service. For example, first entity 110 may capture video from one or more video games, for example using screen capture software. First entity 110 may then transmit the captured video to second entity 120. Second entity 120 may then, in turn, transmit the received video content to various streaming service subscribers, including viewer 140.

Input video stream 115 and output video stream 130 may each include a series of transmitted image frames. As shown in FIG. 1, upon being received by second entity 120, frames included in input video stream 115 are temporarily stored in input frame buffer 121. The received frames are then extracted from input frame buffer 121 and queued in output frame buffer 123 for transmission via output video stream 130. In some examples, input frame buffer 121 may be assigned to hold a particular designated quantity of input frames. The image frames received in input video stream 115 may include timestamps that indicate an ordering of the frames. In some examples, under stable (e.g., non-interrupted) operating conditions, frames may be inserted into output video stream 130 in the same order that they are received from input video stream 115.

In some cases, however, the transmission of the input video stream 115 may be interrupted such that one or more frames of the input video stream 115 are delayed and/or lost (i.e., not received by the second entity 120). The delay or loss of these frames may be caused, for example, by network congestion and saturation, encoding errors, Internet Service Provider (ISP) errors, and other conditions. In some examples, timestamp measurement components 122 may examine and measure the timestamps of the incoming frames received in input video stream 115. For example, timestamp measurement components 122 may identify the timestamps of incoming frames and the respective times at which the incoming frames are received. Timestamp measurement components 122 may provide indications of these measurements to interruption detection components 124, which may detect when a transmission interruption resulting in lost and/or delayed frames has occurred. In some cases, lost and/or delayed frames may be detected when there are gaps in the sequence of the incoming frames, when incoming frames are received out of sequence with respect to one another, and/or when no incoming frames are received within a particular time interval.

Figure 2:
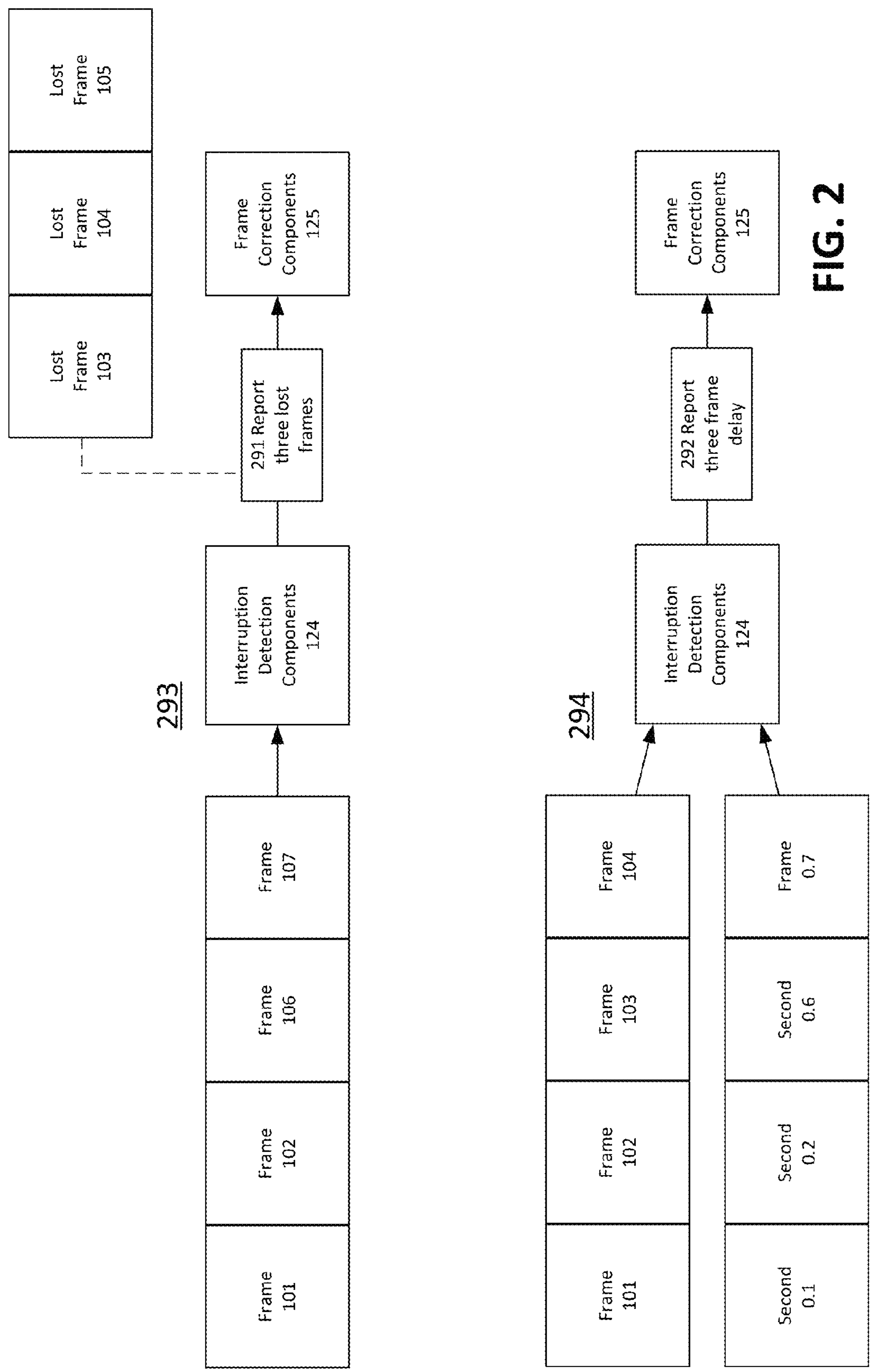
FIG. 2 is a diagram illustrating examples of detections of lost and delayed image frames that may be used in accordance with the present disclosure.

Referring now to FIG. 2, some examples of lost and delayed frames will now be described in detail. For purposes of simplicity, in the examples of FIG. 2, the timestamps of the received frames are indicated by the frame number shown in FIG. 2. For example, frame 101 has a timestamp of 101, frame 102 has a timestamp of 102, and so on. At the top of FIG. 2, an example 293 of lost frames is shown. In example 293, frame 101 is received, followed by frame 102, frame 106, and then frame 107. Thus, it can be determined that there is a three frame gap between frame 102 and frame 106. Based on this gap, interruption detection components 124 may determine that frames 103, 104, and 105 are lost (as represented by the depiction of lost frames 103, 104 and 105 on the top right of FIG. 2). Accordingly, at operation 291, interruption detection components 124 report to frame correction components 125 that there are three lost frames missing from input video stream 115.

An example 294 of frame delay is shown at the bottom of FIG. 2. In example 294, frames are received under stable (e.g., non-interrupted) conditions at a rate of ten frames per second. As shown, frame 101 is received at time of 0.1 seconds, frame 102 is received at time of 0.2 seconds, frame 103 is received at time of 0.6 seconds, and frame 104 is received at time of 0.7 seconds. Thus, in this example, it may be determined that there is a 0.4 second gap between the receive times of frame 102 and frame 103, which is 0.3 seconds longer than the expected gap of 0.1 seconds. There is, therefore, a 0.3 second delay between frame 102 and frame 103. Under stable conditions, three frames would normally be transmitted during the 0.3 second delay between frame 102 and frame 103. Based on these measurements, interruption detection components 124 may calculate that there is a three frame delay between frame 102 and frame 103. Accordingly, at operation 292, interruption detection components 124 report to frame correction components 125 that there is a three frame delay in the input video stream 115.

Thus, as described above, upon detecting that a transmission interruption has occurred, interruption detection components 124 may report the interruption to frame correction components 125, for example indicating a quantity of lost and/or delayed frames, which is also referred to herein as a quantity of frames associated with the transmission interruption. In some examples, frame correction components 125 may then, based at least in part on the quantity of frames associated with the transmission interruption, determine a quantity of correction frames to insert into output video stream 130, for example via output frame buffer 123. For example, in some cases, frame correction components 125 may insert, into output video stream 130, a quantity of correction frames that is equivalent to the quantity of frames associated with the transmission interruption.

As set forth above, in some examples, the input frame buffer 121 may be assigned to hold a designated quantity of input frames received from input video stream 115. This may, in some examples, help to ensure that the input frame buffer 121 retains a sufficient quantity of frames so as to allow the frame correction techniques described herein to be employed without freezing or interruption of the viewed video output. In some examples, when a transmission interruption occurs, the quantity of frames stored in the input frame buffer 121 may temporarily drop below the designated quantity of input frames that the input frame buffer 121 is assigned to hold. However, inserting, into the output video stream, a quantity of correction frames that is equivalent to the quantity of frames associated with the transmission interruption may be advantageous, for example, because it may help to ensure that, after insertion of the correction frames, the input frame buffer 121 returns to holding the designated quantity of input frames.

The inserted correction frames may, for example, include one or more repetitions of one or more previous frames inserted into output video stream 130 and/or one or more interpolated frames. In particular, in some examples, one or more interpolated frames may be inserted between two original frames that are received in the input video stream 115. An interpolated frame is a frame that generally includes one or more interpolated object states, such as interpolated locations, rotations, orientations, colors, sizes, or other states relative to the original frames between which it is inserted. Some example interpolated frames and interpolation techniques will be described in greater detail below, for example with respect to FIGS. 4 and 5.

Figure 3:
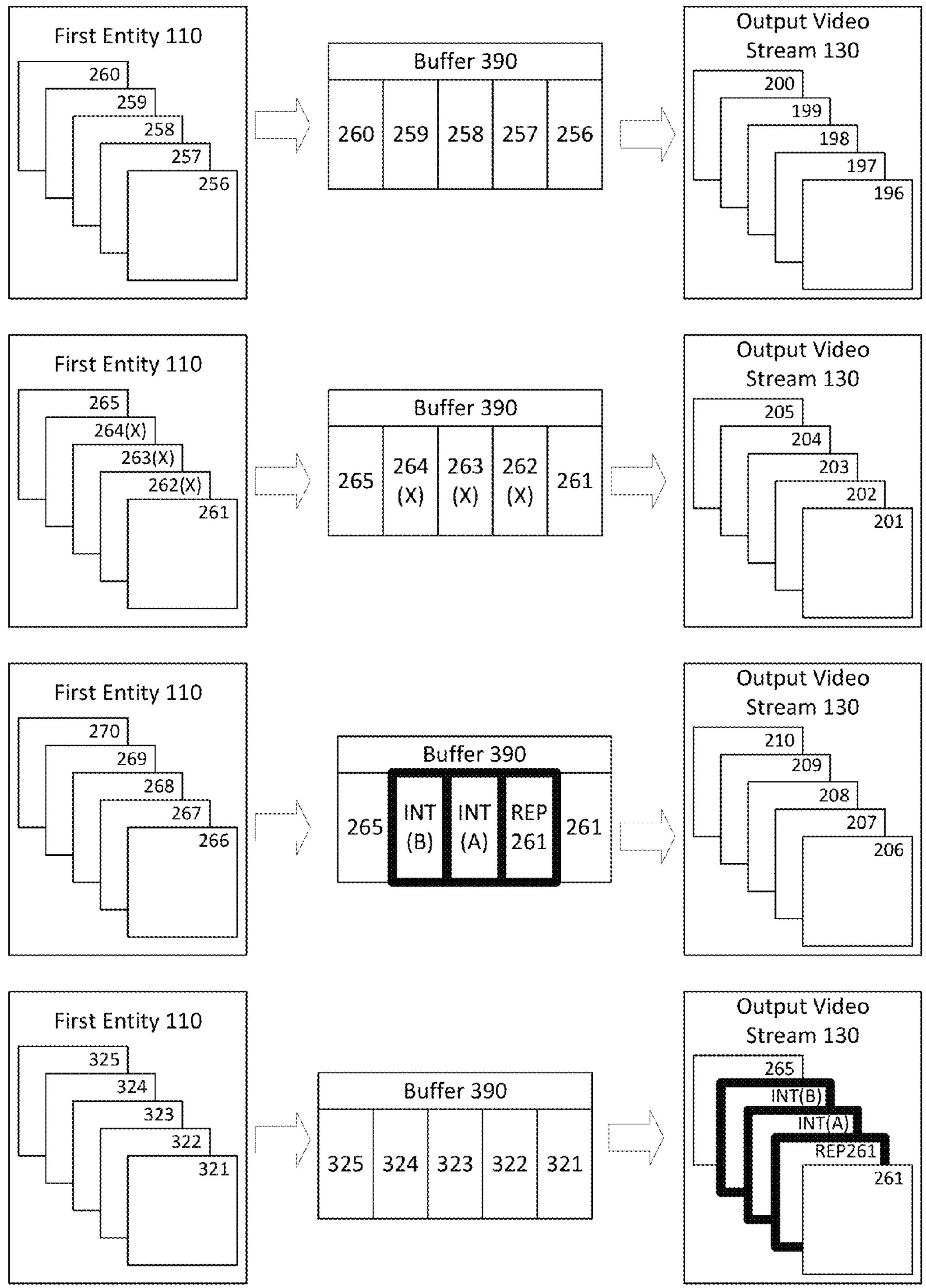
FIG. 3 is a diagram illustrating a first example insertion of correction frames that may be used in accordance with the present disclosure.

Referring now to FIG. 3, an example insertion of correction frames will now be described in detail. As shown at the top left of FIG. 3, first entity 110 may transmit frames 256-260 in succession as part of input video stream 115. The transmitted frames 256-260 may then be received by second entity 120 and stored in buffer 390. It is noted that, in addition to frames 256-260, buffer 390 may also include any number of additional frames (not shown). At the same times that frames 256-260 are being received by second entity 120, frames 196-200 (which were received previously by second entity 120) are being transmitted in output video stream 130. Thus, in this example, under stable conditions, there is generally a sixty frame delay between a frames being received in input video stream 115 and frames being transmitted in output video stream 130. For example, frame 256 is received in input video stream 115 when frame 196 is transmitted in output video stream 130, frame 257 is received in input video stream 115 when frame 197 is transmitted in output video stream 130, and so on. Referring now to the second row of illustrations in FIG. 3, it is seen that subsequent frames 261-265 are transmitted (or attempted to be transmitted) by the first entity 110 in succession as part of input video stream 115. As shown, however, a transmission interruption has occurred between the transmission of frames 261 and 265 resulting in three frames (frames 262-264) being lost (i.e., not received by the second entity 120). FIG. 3 indicates that frames 262-264 are lost by the designation (X) shown in frame numbers 262(X), 263(X), and 264(X). As set forth above, these lost frames may be detected, for example, by determining that the timestamps of received frames have gone directly from 261 to 265 without the intervening timestamps 262-264. At the same times that frames 261 and 265 are being received by second entity 120, frames 201-205 (which were received previously by second entity 120) are being transmitted in output video stream 130.

In some examples, upon detecting that there are three lost frames associated with the transmission interruption between frames 261 and 265, the second entity may, either immediately or at some future time, determine to insert three correction frames into output video stream 130 in order to correct for the three lost frames. Referring now to the third row of illustrations in FIG. 3, it is seen that subsequent frames 266-270 are transmitted by the first entity 110 in succession as part of input video stream 115. At the same times that frames 266-270 are being received by second entity 120, frames 206-210 (which were received previously by second entity 120) are being transmitted in output video stream 130. In this example, during the transmission of frames 266-270, second entity 120 makes a determination to generate and insert three correction frames (represented by thick bold borders) between frames 261 and 265. In particular, immediately following original frame 261, second entity 120 inserts a first correction frame that is a repetition of frame 261 (indicated by the designation REP261 in FIG. 3. Additionally, immediately following the repetition of frame 261 (REP261), second entity 120 inserts a second correction frame that is a first interpolation of original frames 261 and 265 (indicated by the designation INT(A) in FIG. 3). Furthermore, immediately following the first interpolation frame INT(A), second entity 120 inserts a third correction frame that is a second interpolation of original frames 261 and 265 (indicated by the designation INT(B) in FIG. 3).

Referring now to the bottom row of illustrations in FIG. 3, it is seen that subsequent frames 321-325 are transmitted by the first entity 110 in succession as part of input video stream 115. Additionally, at the same times that frames 321-325 are being received by second entity 120, frames 261-265 (including the three correction frames REP261, INT(A), and INT(B)) are being transmitted in output video stream 130. Thus, by inserting these three correction frames into output video stream 130, the techniques described herein allow the transmission interruption resulting in three lost frames 262-264 to be corrected without freezing or interruption of the output video stream 130. In some examples, this may reduce or negate the jumpiness associated with freezing or interruption of the output video stream 130, and a viewer of the output video stream 130 may be unable or only hardly able to notice that the transmission interruption in input video stream 115 had occurred.

In some examples, the input video stream 115 and the output video stream 130 may be transmitted using real time streaming techniques such that frames are displayed to one or more viewers 140 in real time (or near real time) after being transmitted in the input video stream 115. In particular, in some cases, a frame may be viewed by viewer 140 instantaneously (or nearly instantaneously) after being transmitted in the input video stream 115. For example, a frame may be captured by first entity 110, instantaneously (or nearly instantaneously) transmitted to the second entity 120 via input video stream 115, and then instantaneously (or nearly instantaneously) transmitted to the viewer 140 via output video stream 130 for viewing. Streaming protocols such as RTMP may, in some examples, be employed for use in real time streaming techniques. Additionally, in some examples, interpolating of frames and/or inserting of one or more correction frames into the output video stream 130 may be performed on-the-fly, for example during transmission of the input video stream 115. For example, as shown in FIG. 3, correction frames REP261, INT(A), and INT(B) are inserted into buffer 390 for transmission in the output video stream 130 as frames 266-270 are being received in the input video stream 115. Additionally, correction frames REP261, INT(A), and INT(B) are transmitted in the output video stream 130 as frames 321-325 are being received in the input video stream 115.

As set forth above, in some examples, one or more interpolated frames may be inserted between two original frames that are received in the input video stream 115. As also set forth above, an interpolated frame is a frame that includes one or more interpolated states, such as intermediate locations, rotations, orientations, colors, sizes, or other states relative to the original frames between which it is inserted. In particular, in some examples, an interpolated frame may be generated by identifying a state of a particular object in each of the original frames between which the interpolated frame is inserted. The state of the object in the original frames may then be used to determine an interpolated state with which to depict the object in the interpolated frame.

Figure 4:
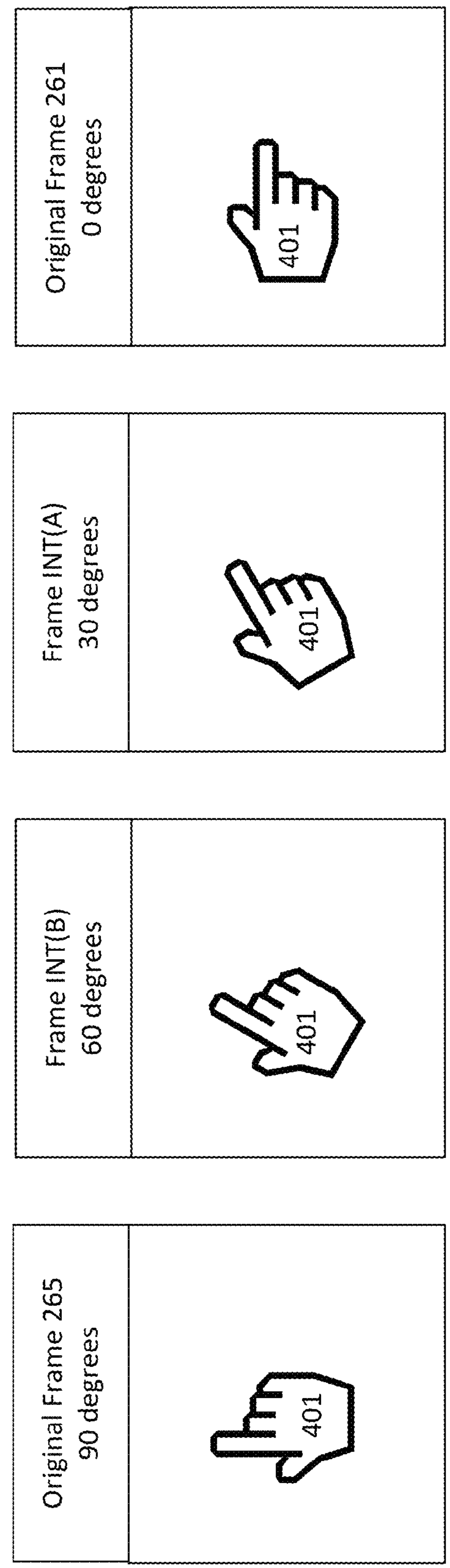
FIG. 4 is a diagram illustrating an example rotation-based frame interpolation that may be used in accordance with the present disclosure.

Some specific examples of interpolated frames will now be described in detail. In particular, referring now to FIG. 4, some examples of frame interpolation using object rotation will now be described. As shown, FIG. 4 depicts examples of original frame 261, a first interpolated frame INT(A), a second interpolated frame INT(B), and an original frame 265 are shown. In the example of FIG. 4, original frame 261 includes a hand 401 with a finger pointing at zero degrees relative to a horizontal line across the frame (referred to hereinafter as a frame horizon). Additionally, original frame 265 includes the hand 401 with a finger pointing at ninety degrees relative to the frame horizon. Thus, it can be determined that the hand 401 has rotated ninety degrees from frame 261 to frame 265. In the example of FIG. 4, interpolated frames INT(A) and INT(B) are generated based on an assumption that the hand 401 has a constant rotational velocity between frames 261 and 265 and that the viewpoint in the frames has remained approximately the same. Additionally, in the example of 4, interpolated frame INT(A) is generated to represent an interpolation at a theoretical frame that is ⅓ between frames 261 and 265 (which would correspond approximately to theoretical frame 262.33). Based on this, it can be calculated that, with a constant rotational velocity between frames 261 and 265, hand 401 should be oriented in interpolated frame INT(A) at an angle thirty degrees relative to the frame horizon (i.e., ⅓ of the rotation from zero degrees to ninety degrees). Accordingly, as shown in FIG. 4, interpolated frame INT(A) depicts hand 401 at an angle of thirty degrees relative to frame horizon. Furthermore, in the example of FIG. 4, interpolated frame INT(B) is generated to represent an interpolation at a theoretical frame that is ⅔ between frames 261 and 265 (which would correspond approximately to theoretical frame 263.67). Based on this, it can be calculated that, with a constant rotational velocity between frames 261 and 265, hand 401 should be oriented in interpolated frame INT(B) at an angle sixty degrees relative to the frame horizon (i.e., ⅔ of the rotation from zero degrees to ninety degrees). Accordingly, as shown in FIG. 4, interpolated frame INT(B) depicts hand 401 at an angle of sixty degrees relative to the frame horizon.

It is noted that FIG. 4 merely depicts one example technique for interpolation of a rotating object and that other interpolation techniques may be employed. For example, in some cases, an alternative technique may be employed in which both interpolated frames INT(A) and INT(B) show two images of hand 401 at both ninety degrees and zero degrees. Additionally, in some examples, the interpolated frames INT(A) and INT(B) may create an appearance of a rotation of hand 401 by showing the two images of the hand 401 at different levels of visibility (e.g., brightness, intensity, thickness, opaqueness, translucency, transparency, etc.). In some cases, objects may be made to appear less visible by being made less bright, less intense, less thick, less opaque, more translucent, more transparent, or using any combination of these or other techniques. Also, in some cases, objects may be made to appear more visible by being made more bright, more intense, more thick, more opaque, less translucent, less transparent, or using any combination of these or other techniques. For example, for cases in which INT(A) is associated with an angle of thirty degrees, INT(A) may include a first image of hand 401 at zero degrees depicted with a 66.7% visibility (relative to the visibility of hand 401 in frames 261 and/or 265) and a second image of hand 401 at zero degrees depicted with a 33.3% visibility (relative to the visibility of hand 401 in frames 261 and/or 265). Showing two images of the hand 401 in this manner may, in some examples, create the appearance that the hand 401 has rotated thirty degrees. Additionally, for cases in which INT(B) is associated with an angle of sixty degrees, INT(B) may include a first image of hand 401 at zero degrees depicted with a 33.3% visibility (relative to the visibility of hand 401 in frames 261 and/or 265) and a second image of hand 401 at zero degrees depicted with a 66.7% visibility (relative to the visibility of hand 401 in frames 261 and/or 265). Showing two images of the hand 401 in this manner may, in some examples, create the appearance that the hand 401 has rotated sixty degrees.

Figure 5:
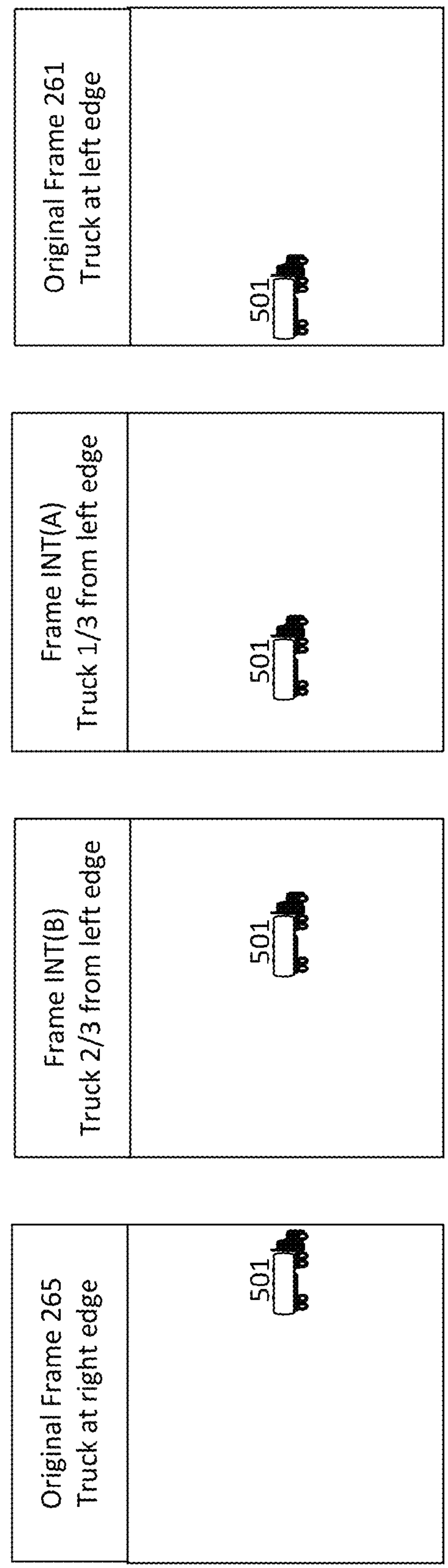
FIG. 5 is a diagram illustrating an example movement-based frame interpolation that may be used in accordance with the present disclosure.

Referring now to FIG. 5, some examples of frame interpolation using object movement will now be described. In the example of FIG. 5, original frame 261 includes a truck 501 at the left edge of the frame that is headed horizontally across the frame towards the right edge. Additionally, original frame 265 includes the truck 501 at the right edge of the frame. In the example of FIG. 5, interpolated frames INT(A) and INT(B) are generated based on an assumption that the truck 501 has a constant velocity between frames 261 and 265 and that the viewpoint in the frames has remained approximately the same. Additionally, in the example of FIG. 5, interpolated frame INT(A) is generated to represent an interpolation at a theoretical frame that is ⅓ between frames 261 and 265 (which would correspond approximately to theoretical frame 262.33). Based on this, it can be calculated that, with a constant velocity between frames 261 and 265, truck 501 should be located in interpolated frame INT(A) at a location that is ⅓ of the distance from the left edge of the frame to the right edge of the frame. Accordingly, as shown in FIG. 5, interpolated frame INT(A) depicts truck 501 at a location that is ⅓ of the distance from the left edge of the frame to the right edge of the frame. Furthermore, in the example of 5, interpolated frame INT(B) is generated to represented an interpolation at a theoretical frame that is ⅔ between frames 261 and 265 (which would correspond approximately to theoretical frame 263.67). Based on this, it can be calculated that, with a constant velocity between frames 261 and 265, truck 501 should be located in interpolated frame INT(B) at a location that is ⅔ of the distance from the left edge of the frame to the right edge of the frame. Accordingly, as shown in FIG. 5, interpolated frame INT(B) depicts truck 501 at a location that is ⅔ of the distance from the left edge of the frame to the right edge of the frame.

It is noted that, while FIGS. 4 and 5 depict example interpolations based on rotation and movement, other interpolations may also be performed based on other states, such as size, color, and many others. For example, in some cases, if an object changed color from red in frame 261 to yellow in frame 265, the object could, in some examples, be depicted with a red-orange color in interpolated frame INT(A) and then with an orange-yellow in interpolated frame INT(B).

It is further noted that, while the above described examples are based on an assumption of a constant rate of change of state between frames 261 and 265, the interpolation techniques described herein are not limited to constant rates of change and may also include examples in which a rate of change between states increases or decreases. For example, in the case of FIG. 4, it may be possible that hand 401 is gradually slowing down its rate of rotation as it rotates from zero degrees to ninety degrees. In this case, the hand 401 may, in some examples, be depicted in interpolated frame INT(A) at an angle that is greater than thirty degrees, such as forty degrees. The hand 401 may also, in some examples, be depicted in interpolated frame INT(B) at an angle that is greater than sixty degrees, such as sixty-five degrees. In some examples, a rate of change of state may be determined by examining states of objects in additional frames besides the two frames between which an interpolated frame is inserted (e.g., frames 259, 266, 258, 267, and so forth). For example, if hand 401 rotates a greater distance between frames 260 and 261 than between frames 265 and 266, then this may sometimes be determined to indicate that the rate of rotation of hand 401 is decreasing. By contrast, if hand 401 rotates a greater distance between frames 265 and 266 than between frames 260 and 261, then this may sometimes be determined to indicate that the rate of rotation of hand 401 is increasing.

Figure 6:
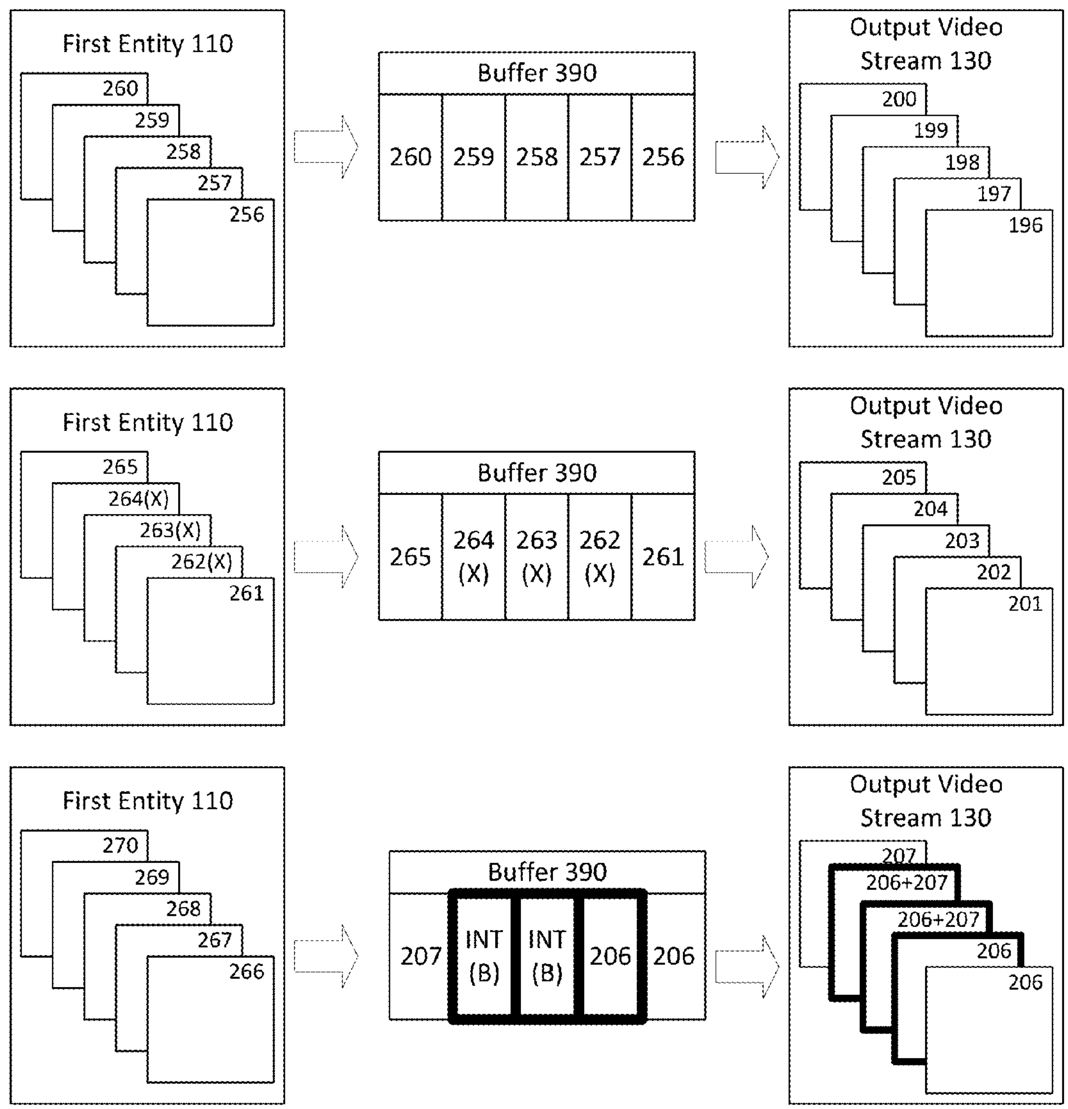
FIG. 6 is a diagram illustrating a second example insertion of correction frames that may be used in accordance with the present disclosure.

Thus, interpolation techniques such as those described above may sometimes be used to correct for lost or delayed frames, such as shown in the example of FIG. 3. In the example of FIG. 3, three correction frames (i.e., frames REP261, INT(A), and INT(B)) are inserted into the output video stream 130 at locations at which the lost frames 262-264 were detected (i.e., between received frames 261-265). It is noted, however, that there is no requirement that correction frames must be inserted into the output video stream 130 at locations at which lost frames are detected and may, in some cases, be inserted at other locations. In particular, referring now to FIG. 6, an example will be described in which correction frames are inserted into output video stream in advance of locations at which lost frames are detected. As shown in FIG. 6, the second row of illustrations indicates that, just as in the prior example of FIG. 3, a transmission interruption has occurred between the transmission of frames 261 and 265 resulting in three frames (frames 262-264) being lost (i.e., not received by the second entity 120). FIG. 6 indicates that frames 262-264 are lost by the designation (X) shown in frame numbers 262(X), 263(X), and 264(X).

Referring now to the third row of illustrations in FIG. 6, it is seen that second entity 120 makes a determination to generate and insert three correction frames (represented by thick bold borders) between frames 206 and 207. In particular, immediately following original frame 206, second entity 120 inserts a first correction frame that is a repetition of frame 206 (indicated by the designation REP206 in FIG. 6). Additionally, immediately following the repetition of frame 206 (REP206), second entity 120 inserts a second correction frame that is a first interpolation of original frames 206 and 207 (indicated by the designation INT(A) in FIG. 6). Furthermore, immediately following the first interpolation frame INT(A), second entity 120 inserts a third correction frame that is a second interpolation of original frames 206 and 207 (indicated by the designation INT(B) in FIG. 6). Thus, as shown in the example of FIG. 6, correction frames may, in some examples, be inserted into an output video stream at a location (i.e., between frames 206 and 207) in advance of a location at which lost or delayed frames are detected (i.e., between frames 261 and 265).

Figure 7:
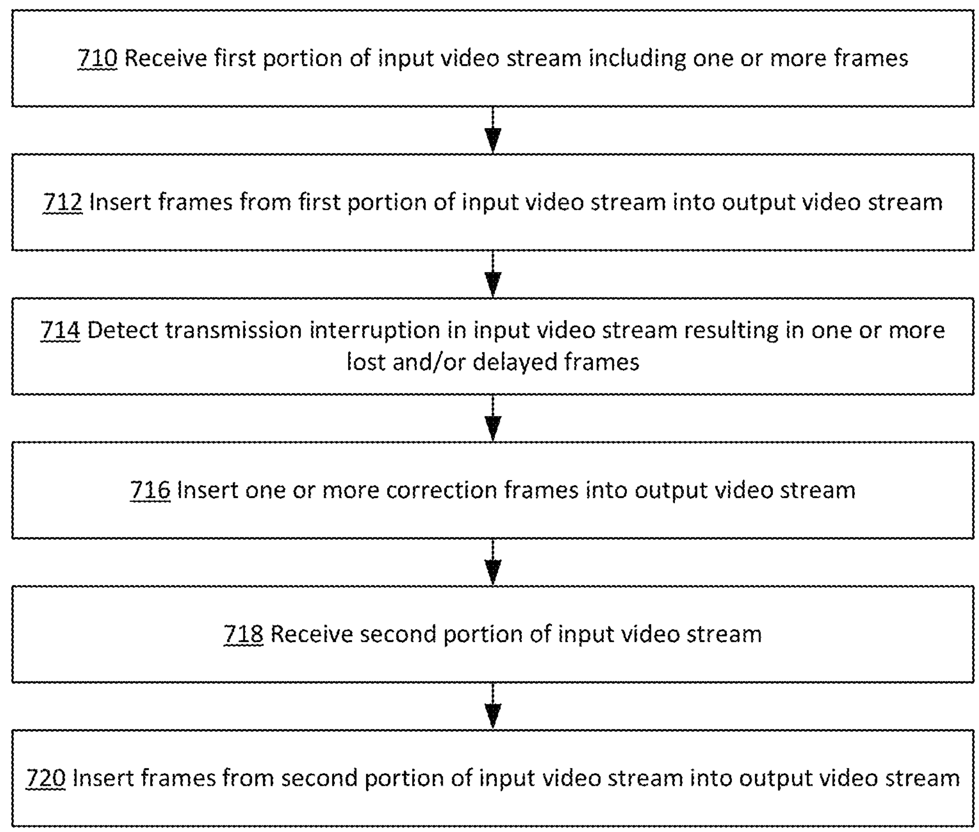
FIG. 7 is a flowchart illustrating an example output frame correction process that may be used in accordance with the present disclosure.

FIG. 7 is a flowchart illustrating an example output frame correction process that may be used in accordance with the present disclosure. The process of FIG. 7 is initiated at operation 710, at which a first portion of an input video stream of a transmitted video item is received. As set forth above, the transmitted video item may, for example, be a video game, news, or sports broadcast. In some examples, the input video stream may be received over one or more electronic communications networks, for example one or more local area networks (LANs) and/or one or more wide area networks (WANs), such as the Internet. The input video stream may be transmitted using streaming video transmission techniques that allow portions of the video item to be viewed while subsequent portions of the video item are being transmitted. In some examples, the transmitted video item may be a live streaming video item that is captured, for example using a video camera, screen capture software, or another capture component, and then transmitted and viewed immediately or nearly immediately after being captured. As also set forth above, the first portion of the input video stream may include one or more image frames. Upon being received, the one or more image frames may be temporarily stored in an input frame buffer.

At operation 712, the one or more image frames included in the first portion of the input video stream are inserted into an output video stream of the video item. The output video stream may be provided for presentation to one or more viewers. As set forth above, in some examples, the output video stream may be transmitted for presentation to one or more viewers over one or more electronic communications networks, for example one or more local area networks (LANs) and/or one or more wide area networks (WANs), such as the Internet. The output video stream may be transmitted using streaming video transmission techniques that allow portions of the video item to be viewed while subsequent portions of the video item are being transmitted.

At operation 714, a transmission interruption resulting in one or more lost or delayed image frames in the input video stream is detected. As set forth above, in some examples, image frames received in the input video stream may include timestamps that indicate an ordering of the frames. In some examples, the timestamps of the frames received in the input video stream may be examined and compared to a time at which the frames are received. In some examples, a transmission interruption may be detected when there are gaps in the sequence of the incoming frames, when incoming frames are received out of sequence with respect to one another, and/or when no incoming frames are received within a particular time interval. In particular, in the example of FIG. 3 described above, the first portion of the input video stream may include frames 1 through 261. A transmission interruption may then be detected at frame 261, which results in frames 262-264 being lost.

At operation 716, one or more correction frames are inserted into the output video stream. As set forth above, correction frames are frames that are either a repetition of a previous image frame inserted into the output video stream or an interpolation of one or more image frames received in the input video stream. In particular, in the example of FIG. 3 described above, three correction frames are inserted into the output video streams. The three correction frames include a repetition of frame 261 (referred to as REP261) and two interpolations between frames 261 and 265 (referred to as INT(A) and INT(B)). Insertion of the correction frames may allow playing of the output video stream without freezing or interrupting the output video stream.

As set forth above, an interpolated frame may be generated based, at least in part, on a first and a second frame in the output video stream between which the interpolated frame is inserted. In some examples, generating of the interpolated frame may include determining a first state of an object in the first frame, determining a second state of the object in the second frame, determining, based at least in part on the first state and the second state, and interpolated state of the object in the interpolated frame, and generating the interpolated frame including the object with the interpolated state. The interpolated state may, in some examples, include a location, a rotation, an orientation, a color, a size, and/or another type of state. In some examples, in addition to the two original frames between which the interpolated frame is inserted, other frames may also be used to determine the interpolated state, such as by calculating an estimated rate of change of the state of an object.

In some examples, when a transmission interruption is detected at operation 714, a quantity of frames associated with the transmission interruption (e.g., a quantity of lost and/or delayed frames) may be determined. The quantity of correction frames that are inserted into the output stream at operation 716 may then be determined based, at least in part, on the quantity frames associated with the transmission interruption. For example, in some cases, the quantity of inserted correction frames may be equivalent to the quantity of frames associated with the transmission interruption. In some examples, equating the quantity of inserted correction frames to the quantity of frames associated with the transmission interruption may, upon completion of the insertion of the correction frames, allow the input frame buffer to re-filled to its designated quantity of input frames.

At operation 718, subsequent to the detected transmission interruption, a second portion of the input video stream is received. The second portion of the input video stream may include one or more image frames. In particular, in the example of FIG. 3 described above, the transmission interruption resulted in frames 262-264 being lost, and the second portion of the input video stream may include frames 265 and following. At operation 720, the one or more image frames included in the second portion of the input video stream are inserted into the output video stream. In some examples, video data from the input video stream may be saved by the second entity prior to being transmitted to one or more viewers, such as in a video on demand (VOD) library or other collection of stored videos. Thus, in some examples, the output video stream as described above may instead be a video output, which may encompass either or both of an output video stream that is provided to the viewer by transmission over a communications network from the second entity to the viewer or a video output that is stored, for example by the second entity in a VOD library for future viewing.

It is also noted that, in some examples, the techniques described herein may be used in combination with other techniques, such as those in which one or more placeholder images (e.g., advertisements, indications of technical difficulty, etc.) are inserted into the output video stream. For example, in some cases, for extended transmission interruptions that include large quantities of lost or delayed frames, the second entity may begin to insert correction frames using the techniques described herein, for example until reaching a threshold quantity and/or duration of inserted correction frames. After reaching this threshold, the second entity could then switch to inserting one or more placeholder images.

Figure 8:
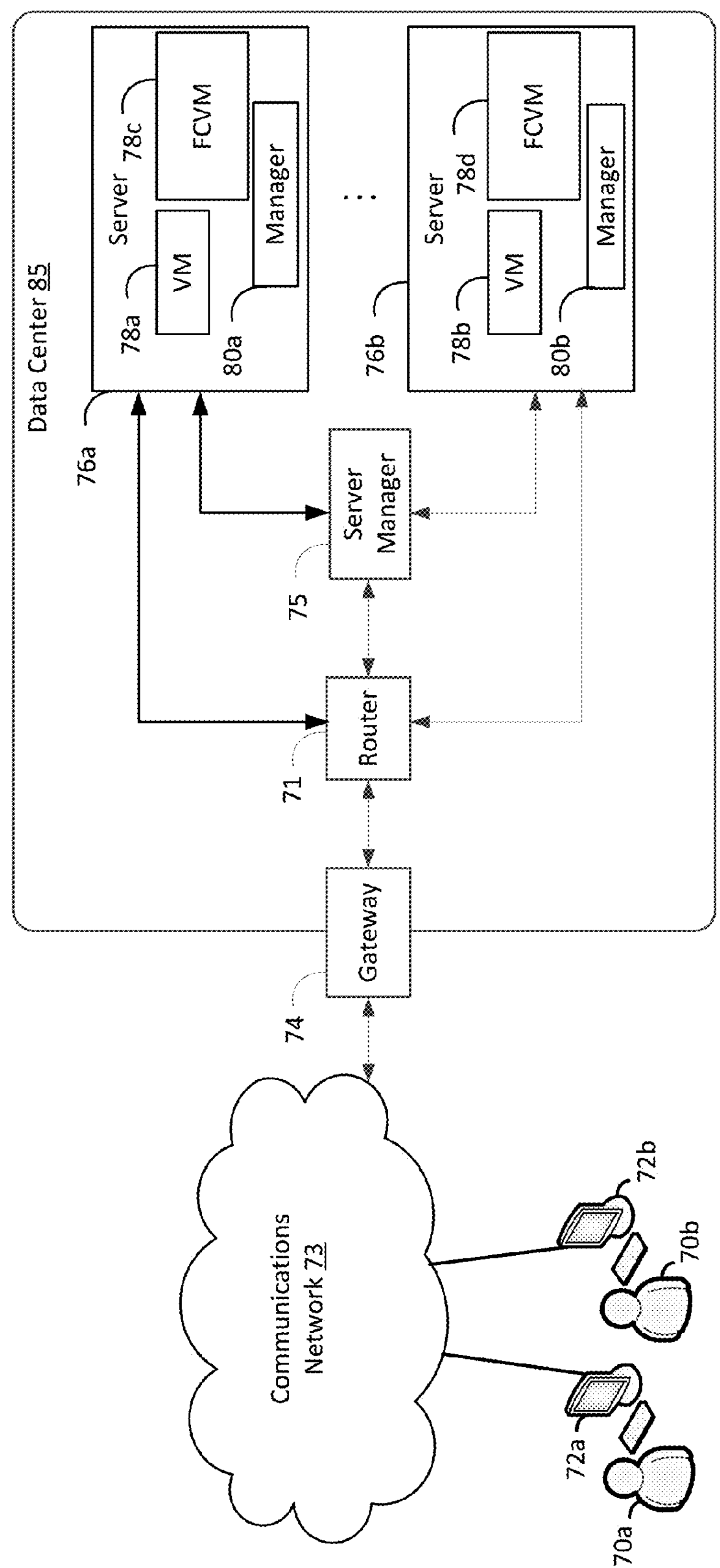
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78). Virtual machine instances 78*c* and 78*d* are frame correction virtual machine ("FCVM") instances. The FCVM virtual machine instances 78*c* and 78*d* may be configured to perform all, or any portion, of the frame correction techniques and/or any other of the disclosed techniques in accordance with the present disclosure and described in detail above. As should be appreciated, while the particular example illustrated in FIG. 8 includes one FCVM virtual machine in each server, this is merely an example. A server may include more than one FCVM virtual machine or may not include any FCVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76*a* and 76*b*. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
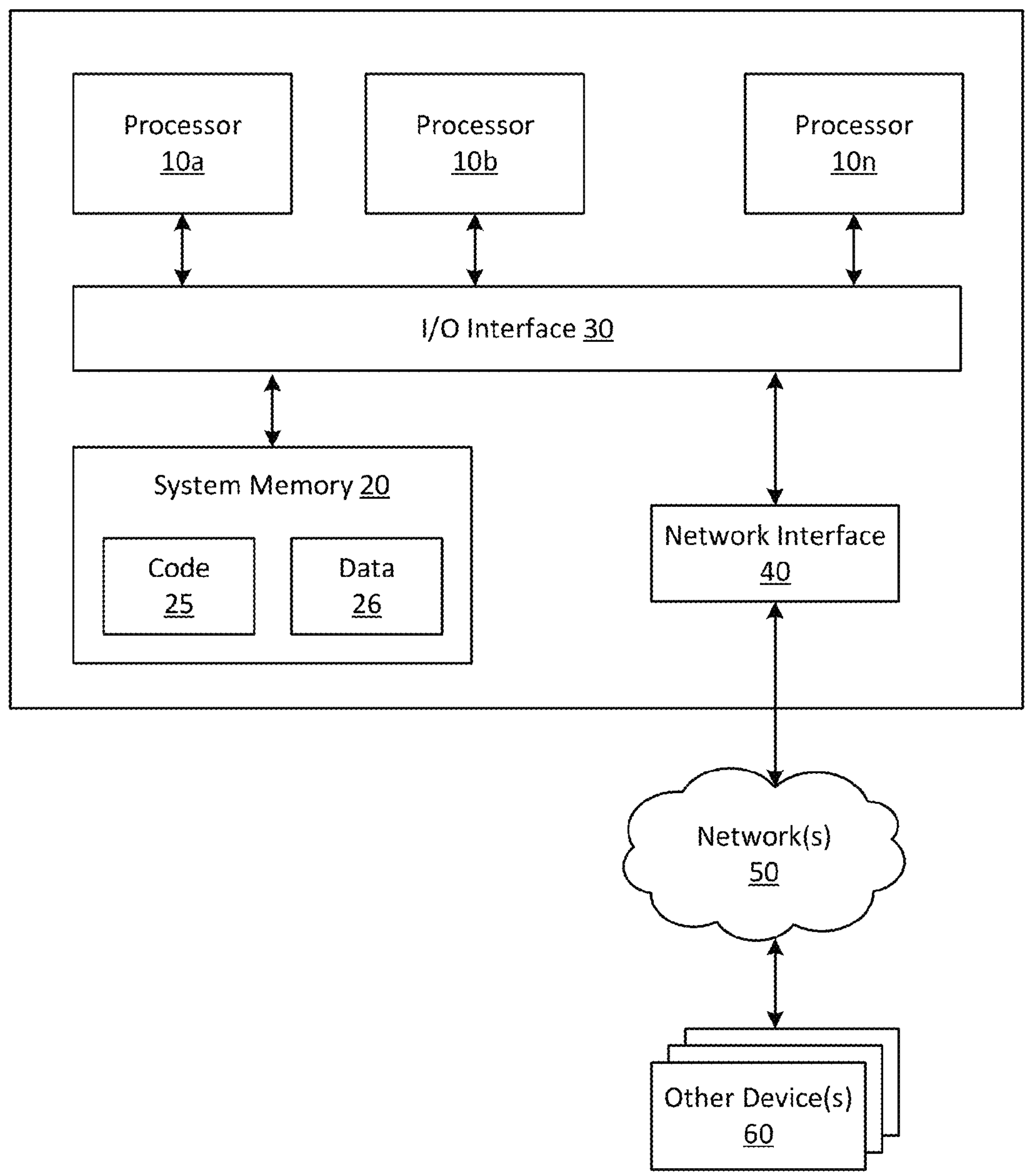
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for output frame correction comprising:

one or more processors; and one or more memories having stored therein instructions that, upon execution by the one or more processors, cause the computing system perform operations comprising:

receiving a first portion of an input video stream of a video item, the input video stream received over one or more communications networks, the first portion of the input video stream including one or more frames;

inserting, into an output video stream of the video item, the one or more frames included in the first portion of the input video stream, the output video stream transmitted for presentation over one or more communications networks to one or more viewers;

detecting a transmission interruption resulting in one or more lost or delayed frames in the input video stream; and inserting, into the output video stream, at least one correction frame that is a repetition of a previous frame in the output video stream or an interpolated frame;

receiving a second portion of the input video stream including one or more frames; and inserting, into the output video stream, the one or more frames included in the second portion of the input video stream.

2. The computing system of claim 1, wherein the inserting the at least one correction frame allows playing of the output video stream without freezing or interrupting the output video stream.

3. The computing system of claim 1, wherein the operations further comprise:

generating the interpolated frame based, at least in part, on a first and a second frame in the output video stream between which the interpolated frame is inserted.

4. The computing system of claim 1, wherein the input video stream and the output video stream are transmitted using real time streaming techniques such that frames are displayed to the one or more viewers in real time or near real time after being transmitted in the input video stream, and wherein the inserting the at least one correction frame is performed during transmission of the input video stream.

5. A computer-implemented method for output frame correction:

receiving a first portion of an input video stream of a video item, the input video stream received over one or more communications networks, the first portion of the input video stream including one or more frames;

inserting, into a video output of the video item, the one or more frames included in the first portion of the input video stream, the video output provided for presentation to one or more viewers;

detecting a transmission interruption resulting in one or more lost or delayed frames in the input video stream; and inserting, into the video output, at least one correction frame that is a repetition of a previous frame in the video output or an interpolated frame;

receiving a second portion of the input video stream including one or more frames; and inserting, into the video output, the one or more frames included in the second portion of the input video stream.

6. The computer-implemented method of claim 5, wherein the inserting the at least one correction frame allows playing of the video output without freezing or interrupting the video output.

7. The computer-implemented method of claim 5, further comprising:

determining a quantity of frames associated with the transmission interruption; and determining, based at least in part on the quantity of frames associated with the transmission interruption, a quantity of correction frames to insert into the video output.

8. The computer-implemented method of claim 7, wherein the quantity of correction frames inserted into the video output is equivalent to the quantity of frames associated with the transmission interruption.

9. The computer-implemented method of claim 8, wherein inserting the quantity of correction frames that is equivalent to the quantity of frames associated with the transmission interruption allows an input frame buffer to be refilled to a designated quantity of frames.

10. The computer-implemented method of claim 5, wherein the video output is an output video stream that is transmitted, over one or more communications networks, to the one or more viewers.

11. The computer-implemented method of claim 10, wherein the input video stream and the output video stream are transmitted using real time streaming techniques such that frames are displayed to the one or more viewers in real time or near real time after being transmitted in the input video stream, and wherein the inserting the at least one correction frame is performed during transmission of the input video stream.

12. The computer-implemented method of claim 5, further comprising:

generating the interpolated frame based, at least in part, on a first and a second frame in the video output between which the interpolated frame is inserted.

13. The computer-implemented method of claim 12, wherein the generating the interpolated frame comprises:

determining a first state of an object in the first frame;

determining a second state of the object in the second frame;

determining, based at least in part on the first state and the second state, an interpolated state of the object in the interpolated frame; and generating the interpolated frame including the object with the interpolated state.

14. The computer-implemented method of claim 13, wherein the interpolated state is at least one of a location, a rotation, an orientation, a color, or a size.

15. One or more non-transitory computer-readable storage media having stored thereon instructions that, upon execution by one or more computing devices, cause the one or more compute nodes to perform operations comprising:

receiving a first portion of an input video stream of a video item, the input video stream received over one or more communications networks, the first portion of the input video stream including one or more frames;

inserting, into a video output of the video item, the one or more frames included in the first portion of the input video stream, the video output provided for presentation to one or more viewers;

detecting a transmission interruption resulting in one or more lost or delayed frames in the input video stream; and inserting, into the video output, at least one correction frame that is a repetition of a previous frame in the video output or an interpolated frame;

receiving a second portion of the input video stream including one or more frames; and inserting, into the video output, the one or more frames included in the second portion of the input video stream.

16. The one or more non-transitory computer-readable storage media of claim 15, wherein the operations further comprise:

determining a quantity of frames associated with the transmission interruption; and determining, based at least in part on the quantity of frames associated with the transmission interruption, a quantity of correction frames to insert into the video output.

17. The one or more non-transitory computer-readable storage media of claim 16, wherein the quantity of correction frames inserted into the video output is equivalent to the quantity of frames associated with the transmission interruption.

18. The one or more non-transitory computer-readable storage media of claim 17, wherein inserting the quantity of correction frames that is equivalent to the quantity of frames associated with the transmission interruption allows an input frame buffer to be refilled to a designated quantity of frames.

19. The one or more non-transitory computer-readable storage media of claim 15, wherein the operations further comprise:

generating the interpolated frame based, at least in part, on a first and a second frame in the video output between which the interpolated frame is inserted.

20. The one or more non-transitory computer-readable storage media of claim 19, wherein the generating the interpolated frame comprises:

determining a first state of an object in the first frame;

determining a second state of the object in the second frame;

determining, based at least in part on the first state and the second state, an interpolated state of the object in the interpolated frame; and generating the interpolated frame including the object with the interpolated state.

* * * * *